June 6, 1933.  E. R. KLEPEL  1,912,847
REST FOR TIERING TRUCKS
Filed Feb. 5, 1931
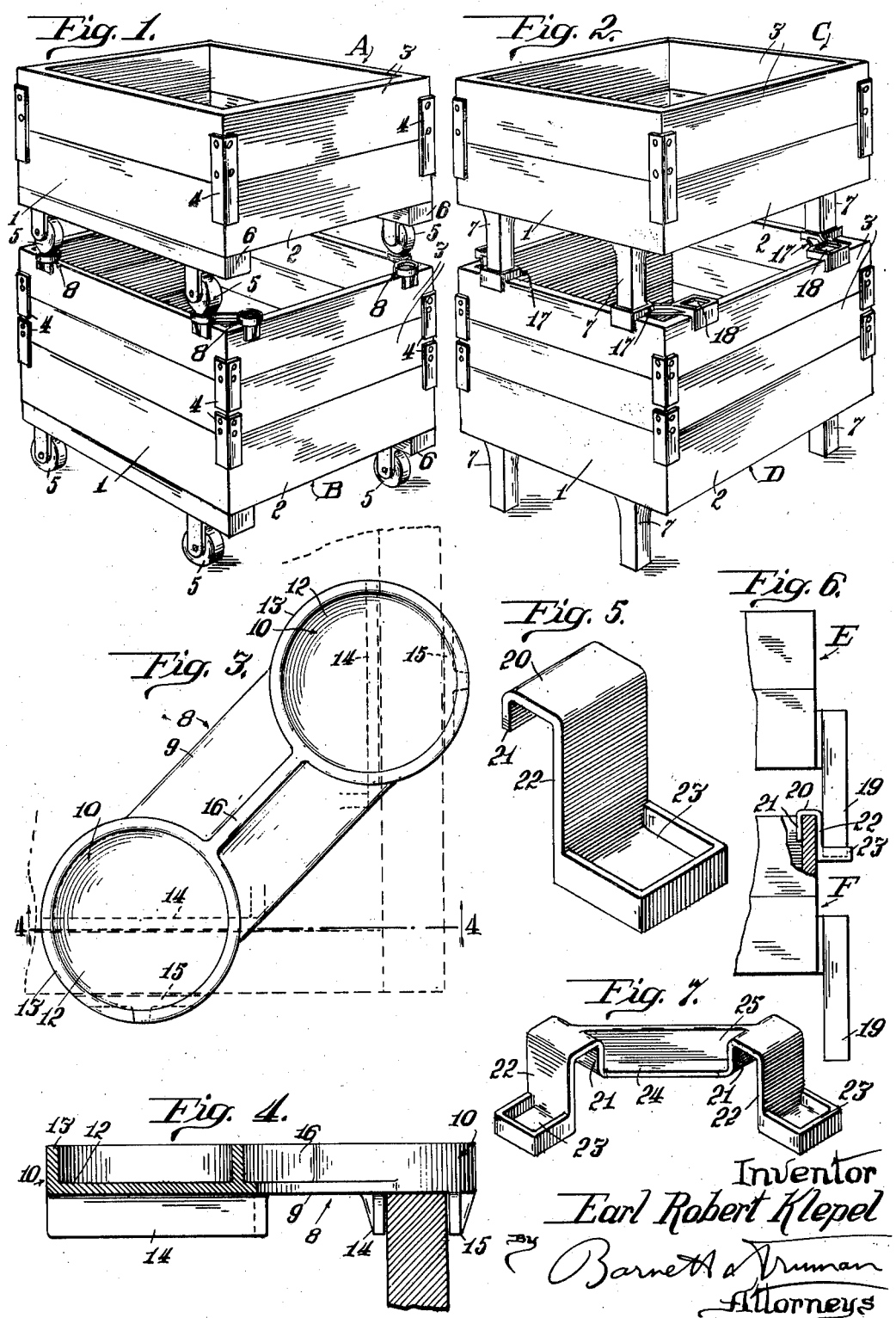
Inventor
Earl Robert Klepel
Attorneys Patented June 6, 1933

1,912,847

UNITED STATES PATENT OFFICE

EARL ROBERT KLEPEL, OF RACINE, WISCONSIN, ASSIGNOR TO WALKER MANUFACTURING COMPANY, OF RACINE, WISCONSIN, A CORPORATION OF WISCONSIN

REST FOR TIERING TRUCKS

Application filed February 5, 1931. Serial No. 513,664.

This invention relates to a new and improved rest or supporting device for use in tiering trucks, and more particularly to a simple device for supporting the legs or casters of a superposed truck from the upper side walls of a lower truck body.

In factories or store-houses, it is customary to use box trucks equipped either with supporting legs or with casters or wheels, and it is often desirable to tier or stack these trucks one above the other to economize floor space, either when the trucks contain articles to be stacked, or when the trucks are empty and not in service.

The present invention relates to a simple device which is attached to and supported by the side wall or walls of a truck body adjacent a corner thereof, said device being adapted to receive and support a leg or caster of the superposed truck. The device may be conveniently made in the form of a simple integral casting, several forms of which are disclosed in the specifications which follow.

The principal object of the invention is to provide an improved rest for tiering trucks, as briefly referred to hereinabove and disclosed more in detail in the specifications which follow.

Another object is to provide such a rest adapted to receive and support the superposed truck in any of its positions of angular adjustment, that is, the legs or casters may be positioned at any of the four sides of the truck body and the rest will be in position to receive them.

Other objects and advantages of this invention will be more apparent from the following detailed description of certain approved forms of devices constructed according to the principles of this invention.

In the accompanying drawing:

Fig. 1 is a perspective view showing a pair of tiered trucks provided with wheels or casters, and illustrating the use of one form of this invention.

Fig. 2 is a similar view showing truck bodies provided with rigid legs.

Fig. 3 is a plan view of one of the rests of the form shown in Fig. 1.

Fig. 4 is a vertical section, taken substantially on the line 4—4 of Fig. 3.

Fig. 5 is a perspective view of a form of rest adapted for use with trucks having the legs positioned outside the vertical plane of the outer wall of the truck side.

Fig. 6 is a partial elevation showing the use of the form of rest or support shown in Fig. 5.

Fig. 7 is a perspective view showing a double or duplex rest of the type shown in Fig. 5.

In Fig. 1 is shown a pair of similar box trucks A and B, each truck being of generally square horizontal section, closed at the bottom, and open at the top. Each truck has fixed side and end walls 1 and 2, and the height of the truck may be increased, as desired, by adding frame sections consisting of side walls 3 provided with corner angle plates 4 adapted to fit down around the walls 1 and 2 of the fixed truck body so as to hold the auxiliary walls 3 in place. As many of these auxiliary side wall frames may be added as may be desired or necessary. As shown in Fig. 1, the upper truck A has one additional section and the lower truck B has two. Each truck A and B is provided with supporting wheels or casters 5, here shown as attached to a lower side beam 6, each wheel 5 being spaced inwardly somewhat from a corner of the truck, in the usual manner. As far as the present invention is concerned, these supporting members may be either rigid wheels or swiveled casters, both forms of trucks being in common use.

The trucks shown in Fig. 2 at C and D have the same general body construction as the trucks A and B previously described, but instead of being provided with wheels or casters the trucks C and D have rigid legs 7 which are positioned along two opposite side walls at locations spaced somewhat from the adjacent corner, the positions of these legs corresponding to the positions of the wheels 5 in the form of truck previously described. Box trucks of this type are used in conjunction with lift trucks by means of which they are transported from place to place.

Referring now to the form of the invention shown in Figs. 1, 3 and 4, the rest indicated generally at 8 is in the form of a single metal casting comprising a main flat body portion 9 adapted to extend diagonally across the upper corner portion of a truck and rest upon the adjacent side and end walls 1 and 2 adjacent the corner. Adjacent each end of the body 9 and substantially over one of the truck walls is formed a cupped or substantially saucer shaped supporting member 10. This cupped support or receptacle 10 may take a variety of forms, in the simple form here shown consisting of a substantially flat circular portion 12 of the supporting plate surrounded by an annular upright wall 13. Each end portion of the member 8, beneath one of the cupped supporting members, is formed with inner and outer depending flanges 14 and 15 adapted to engage against the inner and outer surfaces, respectively, of one of the side walls 1 or 2 of the truck. These depending flanges serve to hook over the wall of the truck and hold the rest 8 in position. In the form here shown, the central bar portion 9 is provided with an upright strengthening rib 16 connecting the two cupped receptacles, and such additional strengthening ribs may be provided on the casting as may be considered necessary or desirable.

Connecting a pair of these receptacles 10 by the bar 9 provides a means for properly spacing each receptacle from the corner of the truck so that one or the other of the pair of receptacles will be in proper position to receive a wheel or leg of the superposed truck.

Referring to Fig. 1, it will be noted that four of these rests 8 are positioned, one on each of the corner portions of the lowermost truck B, and that when the upper truck A is superposed above the truck B, the several wheels or casters 5 will be in position to rest in the cups 10 at one end of each of the rests 8. By providing one of these cups or receptacles at each end of the rest, the upper truck A (when the trucks are square as shown) could be rotated through 90° from its present position and the wheels 5 would then rest in the cups 10 at the opposite ends of the respective rests 8. There is, therefore, no necessity of being careful to face each trunk in a certain direction, since the trucks (when square) can be stacked or tiered with the wheels or casters at any one of the four sides thereof. If the trucks are not square, that is, are of greater length than width, the trucks will have to be tiered from two opposite sides only, and only one cup of each pair is used, although the rests are interchangeable and can be used on any corner of any type of truck.

The form of rests 17 shown in Fig. 2 may be exactly similar to the rest 8, already described, with the exception that the end cups or receptacles 18 are of square or rectangular form to receive the ends of the legs 7. It will now be apparent that the form of rest 8, first described, could be used with either form of truck, since the saucer shaped receptacles 10 are equally adapted to receive the wheels 5 or the legs 7.

In some instances, box trucks of the type shown at E in Fig. 6, are provided with legs 19 (or perhaps equivalent wheeled supports) which are positioned outside of the vertical plane of the adjacent side wall of the truck body. For use with this type of truck, a rest or support of the type shown in Figs. 5 and 6 may be used. This rest comprises an integral metal casting having a hook supporting portion consisting of a central member 20 adapted to rest on the top of the truck side wall, an inner downwardly extending flange 21, and an outer downwardly extending flange 22, at the lower end of which is formed the cupped receptacle or support 23 for receiving the leg 19.

In order to insure a proper positioning of this type of rest for receiving the several legs 19, a double or duplex rest of the type shown in Fig. 7 may be used. This consists of a single metal casting in the form of a pair of rests of the general type shown in Fig. 5 connected by a central bar 24 provided with a vertical strengthening rib 25, this connecting bar portion being adapted to extend diagonally inside of the upper corner of the truck, in much the same manner as the rest 8 shown in Fig. 1.

While several approved forms of this device have been here shown by way of example, it will be apparent that other modified forms could be constructed, and all such equivalent constructions are considered as falling within the scope of the claims which follow.

It will be apparent that this form of rest is quite simple and economical, and may be readily positioned on a truck body when trucks are to be tiered, or removed therefrom when not in use. While in the examples here shown only two trucks are tiered, it will be apparent that three or more trucks could be stacked or tiered in the same manner, rests of the character above disclosed being used between each pair of superposed trucks.

I claim:

1. A rest for tiering box-trucks having legs or casters comprising a member having means adapted to be hooked over an upper edge portion of the truck body adjacent one corner thereof, and a cupped portion outside of the truck body to receive a leg of the superposed truck.

2. A rest for tiering box-trucks having legs or casters comprising a member having means adapted to be hooked over an upper edge portion of the truck body adjacent one corner thereof, and a saucer-shaped portion outside of the truck body adapted to receive a leg or caster of a superposed truck.

3. A rest for tiering box-trucks having legs or casters comprising a metal casting including a portion adapted to be supported upon one upper edge of a truck body adjacent a corner thereof, depending flanges adapted to engage against the inner and outer walls of this side of the truck, and a cup-shaped portion outside of the truck body to suport a leg or caster of a superposed truck.

4. A rest for tiering box-trucks having legs or casters comprising a metal casting including a portion adapted to be supported upon one upper edge of a truck body adjacent a corner thereof, depending flanges adapted to engage against the inner and outer walls of this side of the truck, and an outwardly projected cup-portion formed on the outer flange to support a leg of a superposed truck.

5. A rest for tiering box-trucks having legs or casters comprising a member adapted to extend diagonally of the upper corner portion of a truck body and rest upon the adjacent side walls of the truck, each end portion of the member having depending flanges to be engaged with the inner and outer surfaces of the truck side wall to hold the rest in position, and each end of the member having a cupped portion positioned above the truck side wall and adapted to receive and support a leg of a superposed truck.

6. A rest for tiering box-trucks having legs or casters comprising a member adapted to extend diagonally of the upper corner portion of a truck body and rest upon the adjacent side walls of the truck, each end portion of the member having depending flanges to be engaged with the inner and outer surfaces of the truck side wall to hold the rest in position, and each end of the member having a saucer-shaped portion outside the truck body adapted to receive and support the leg or caster of a superposed truck.

7. A rest for tiering box-trucks having legs or casters comprising a metal casting adapted to extend diagonally of the upper corner portion of a truck body and rest upon the side walls of the truck, each end portion of the member having depending flanges to engage the inner and outer surfaces of the truck side, the flange engaging the outer surface being formed with a cupped portion adapted to receive and support a leg of a superposed truck.

8. A rest for tiering box-trucks having legs or casters comprising a metal casting adapted to extend diagonally of the upper corner portion of a truck body and rest upon the side walls of the truck, each end portion of the member having depending flanges to engage the inner and outer surfaces of the truck side and also being formed with a saucer-shaped portion adapted to receive and support a leg or caster of a superposed truck.

9. A rest for tiering box-trucks having legs or casters comprising a metal casting adapted to extend diagonally of the upper corner portion of a truck body and having upwardly looped ends to engage over the upper edges of the truck side walls at positions spaced from the corner of the truck, and having cupped portions suported at the outer sides of the truck side walls to receive a leg or caster of a superposed truck.

10. Means for tiering box-trucks having legs or casters comprising a rest carried by the upper corner-portion of a truck body and formed with a cupped portion outside the truck body to receive the leg at the corresponding lower corner of a superposed truck.

EARL ROBERT KLEPEL.